(12) United States Patent
Hehmann et al.

(10) Patent No.: US 12,090,700 B2
(45) Date of Patent: Sep. 17, 2024

(54) MONITORING METHOD FOR MONITORING A FILM BUBBLE IN A DISCHARGE REGION DOWNSTREAM OF A DISCHARGE NOZZLE OF A BLOWN FILM DEVICE

(71) Applicant: Windmöller & Hölscher KG, Lengerich (DE)

(72) Inventors: Ingo Hehmann, Lengerich (DE); Markus Bussmann, Lengerich (DE); Martin Backmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 358 days.

(21) Appl. No.: 17/289,824

(22) PCT Filed: Oct. 2, 2019

(86) PCT No.: PCT/EP2019/076732
§ 371 (c)(1),
(2) Date: Apr. 29, 2021

(87) PCT Pub. No.: WO2020/088876
PCT Pub. Date: May 7, 2020

(65) Prior Publication Data
US 2022/0016822 A1    Jan. 20, 2022

(30) Foreign Application Priority Data
Oct. 31, 2018  (DE) .................... 10 2018 127 264.2

(51) Int. Cl.
*B29C 48/92*    (2019.01)
*B29L 23/00*    (2006.01)

(52) U.S. Cl.
CPC .... *B29C 48/92* (2019.02); *B29C 2948/92114* (2019.02); *B29C 2948/92447* (2019.02); *B29L 2023/001* (2013.01)

(58) Field of Classification Search
None
See application file for complete search history.

(56) References Cited

U.S. PATENT DOCUMENTS

2001/0042589 A1    11/2001  Kobayashi

FOREIGN PATENT DOCUMENTS

| EP | 0516992 A1 | 12/1992 |
|----|------------|---------|
| EP | 1616687 A1 | 1/2006 |

(Continued)

OTHER PUBLICATIONS

Machine translation of Sensen et al_EP_0516992_A1_I (Year: 1992).*

(Continued)

*Primary Examiner* — Robert J Grun
(74) *Attorney, Agent, or Firm* — Peter W. Schroen; Bret E. Field; Bozicevic, Field & Francis LLP

(57) ABSTRACT

The invention relates to a monitoring method for monitoring a film bubble (FB) in a discharge region (112) downstream of a discharge nozzle (110) of a blown film device (100), comprising the following steps:
  optically detecting at least one contour parameter (KP) of a film contour (FK) of the film bubble (FB) in the discharge region (112),
  comparing the at least one detected contour parameter (KP) with a specific preset value (VW),
  determining a contour deviation (KA) between the at least one detected contour parameter (KP) and the specific preset value (VW), (Continued)

Figure 1:
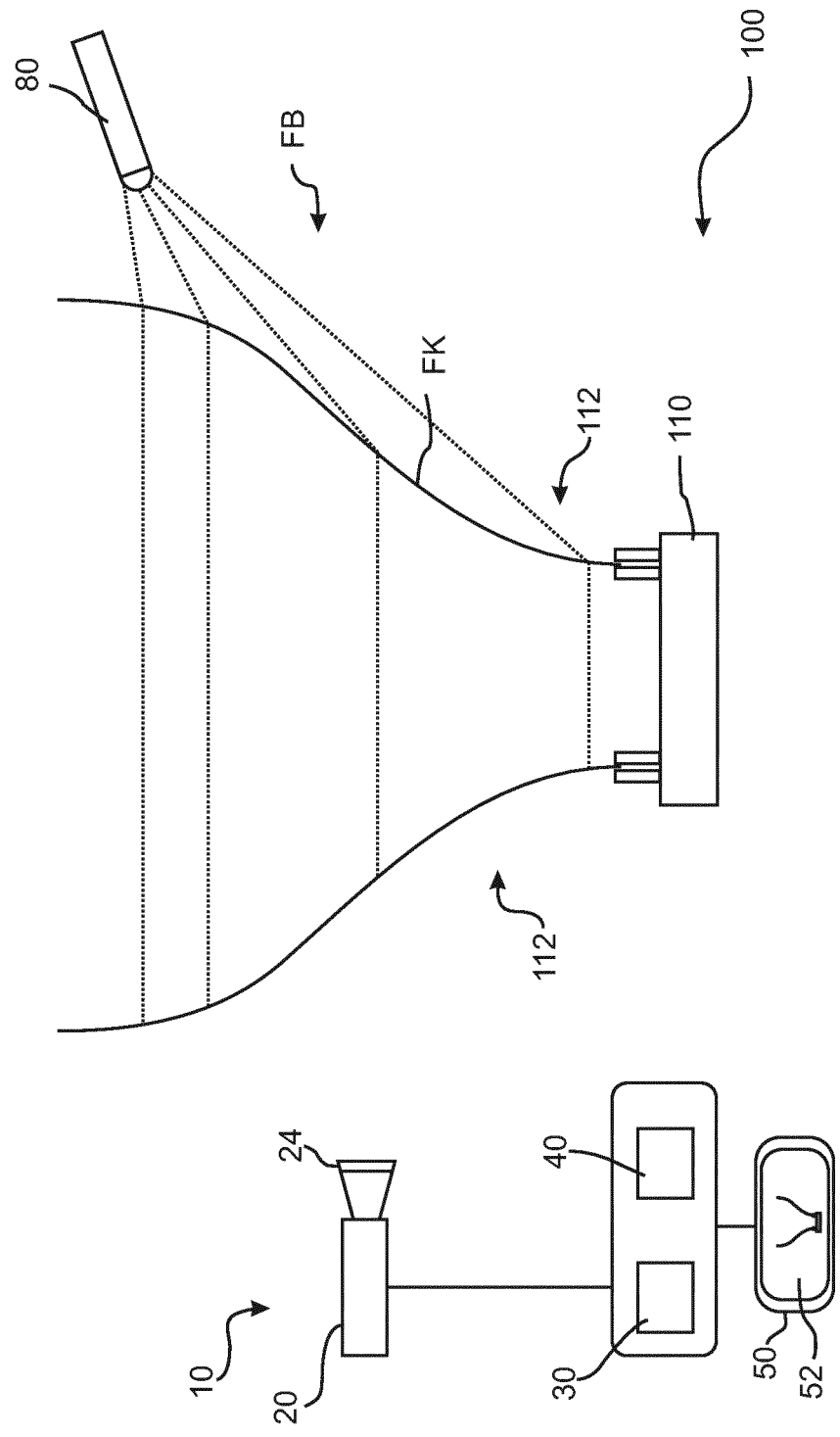

outputting the contour deviation (KA) as monitoring result (UE).

19 Claims, 5 Drawing Sheets

(56) References Cited

FOREIGN PATENT DOCUMENTS

| | | |
|---|---|---|
| GB | 2109591 A | 6/1983 |
| JP | S58-78725 A | 5/1983 |
| JP | H01-317743 A | 12/1989 |
| JP | H04-135734 A | 5/1992 |
| JP | H04-185422 A | 7/1992 |
| JP | H10-100248 A | 4/1998 |
| WO | WO0249828 A2 | 6/2002 |
| WO | WO2006024606 A1 | 3/2006 |

OTHER PUBLICATIONS

Office Action for German Application No. 10 2018 127 264.2 mailed Feb. 8, 2022, with its English translation, 6 pages.

Herschback, Ferndiagnose fur Folienextrusionsanlagen, Kunststoffe-Plast Europe, vol. 88, No. 2, Feb. 1998, p. 162-166, English abstract enclosed.

Betriebsdatenerfassung Als Mittel Zur Betriebsfuehrung, Plastverarbeiter, Huethig GmbH, Heidelberg, DE, vol. 43, No. 5, May 1992, p. 130, 132-134, English abstract enclosed International Preliminary Report on Patentability for PCT Application No. PCT/EP2019/076732 mailed Feb. 12, 2021, 6 pages.

Office Action for German Application No. 102018127264.2 mailed Oct. 25, 2019, with its English summary, 6 pages.

Office Action for European Patent Application No. 19 783 485.6, mailed Jan. 2, 2024, and its English translation, 8 pages.

* cited by examiner

MONITORING METHOD FOR MONITORING A FILM BUBBLE IN A DISCHARGE REGION DOWNSTREAM OF A DISCHARGE NOZZLE OF A BLOWN FILM DEVICE

The present invention relates to a monitoring method for monitoring a film bubble in a discharge region downstream of a discharge nozzle of a blown film device, a monitoring device for performing such a method, and a calibration method for calibrating such a monitoring device.

It is known that blown film devices are used to produce a blown film. Such a blown film is a film product which is composed of a plurality of individual layers. In order to produce such a film product, a plurality of extrusion devices is required corresponding to the individual layers, which produce a flowable layer composition from a plastic granulate and discharge it in a flowable manner via a corresponding discharge nozzle. In a blown film device, this discharge nozzle is substantially annular in shape so that a tubular discharge of the flowable extrusion material occurs. As the flowable extrusion material is conveyed upwardly, this tubular configuration expands to form a film bubble. The expansion of this film bubble along the extrusion direction is then stopped when the flowable extrusion material cools down to the location where it is no longer flowable, i.e. it has solidified. The region where this happens is also called the frost region or frost line.

A disadvantage of the known methods is that the stability of production depends on a large number of different influencing parameters. In part, these influencing parameters relate to environmental parameters, such as air pressure, temperature or humidity in the production hall. Also further influencing factors, which are not in the region of influence of the actual machine of the blown film device, can be relevant for the stability of the production and/or the quality of the produced film product. In order to be able to guarantee this stability of the film product during production as well as the quality characteristics in the desired manner, the known solutions therefore rely at least partially on manual regulation by the operating personnel of such a blown film device. It should be noted, for example, that depending on the environmental parameters, for example the temperature in the production hall, the same setting of the blown film device can result in different stabilities as well as different qualities. With the known solutions, therefore, reliance must be placed on the manual experience of the operating personnel, so that on the one hand there is a certain production risk here, and on the other hand reproducibility of positive or good production is at least not possible in an automated manner.

It is an object of the present invention to at least partially eliminate the disadvantages described above. In particular, it is an object of the present invention to improve the reproducibility of the production stability and/or the production quality in a blown film device in a cost-effective and simple manner.

The above object is solved by a monitoring method with the features of the present disclosure, a monitoring device with the features of the present disclosure, and a calibration method with the features of the present disclosure. Further features and details of the invention result from the dependent claims, the description and the figures. Features and details described in connection with the monitoring method according to the invention naturally also apply in connection with the monitoring device according to the invention and the calibration method according to the invention, and vice versa in each case, so that reference is or can always be made mutually with respect to the disclosure of the individual aspects of the invention.

According to the invention, a monitoring method is used to monitor a film bubble in a discharge region downstream of a discharge nozzle of a blown film device. For this purpose, the monitoring method comprises the following steps:

optically detecting at least one contour parameter of a film contour of the film bubble in the discharge region, comparing the at least one detected contour parameter with a specific preset value, determining a contour deviation between the at least one detected contour parameter and the specific preset value, outputting the contour deviation as monitoring result.

According to the invention, the previous solution of a manual monitoring and controlling of the blown film device is thus replaced by an at least partially automated solution of a monitoring method. This possibility is based on the fact that, with regard to production stability and production quality, the shaping or the corresponding formation of the geometric shape of the film bubble can provide a decisive indication. Up to now, this blown film shape or the film contour has been perceived exclusively by the operating personnel and, depending on the level of experience of the operating personnel, can contain indications for a necessary re-regulation. In accordance with the invention, an optical detection of at least one contour parameter of this film contour of the film bubble is now provided. These can be one-dimensional as well as two-dimensional, three-dimensional or multi-dimensional contour parameters. Later, details and embodiments of contour parameters will be explained in more detail. In the simplest case, therefore, it is a matter of describing at least part of the bubble shape of the film bubble with the aid of an assessable and qualitatively and/or quantitatively processable contour parameter.

As soon as a contour parameter has been optically detected in an automated or partially automated manner, it can be further processed in digital form. In a monitoring method according to the invention, this is done by comparing this at least one detected contour parameter with a specific preset value. The specific preset value is specific to the respective contour parameter. If, for example, a contour line is provided as the upper limit and/or lower limit for the entire contour line of the film contour, this preset value can represent the corresponding line extension or the corresponding corridor. The result is therefore a comparison which allows the real distance, in particular a geometric correlation value or a geometric distance, between the detected contour parameter and the specific preset value to be determined. In the subsequent method step of a monitoring method according to the invention, a contour deviation between the at least one detected contour parameter and the specific preset value can be determined in this way. This contour deviation can now be output directly or in further processed form in an indirect manner as a monitoring result.

In the following, one possibility for a method according to the invention is explained by way of example for better explanation. For example, the center line of a symmetrical or essentially symmetrical (rotational symmetry) film bubble can be acquired as a contour parameter. This central axis of the film bubble can be optically detected as a contour parameter. A comparison of this central axis of the film bubble with a specific preset value can be made, for example, in the form of a central axis of symmetry of the discharge nozzle. Thus, the actual distance between the detected central axis of the film bubble and the central axis of the discharge nozzle can be determined as a contour deviation. This deviation can be output or displayed directly as a monitoring result or in a revised form. It allows a conclusion to be drawn as to whether the film bubble is arranged centrally or off-center above the discharge nozzle. The greater the deviation from the central alignment along the central axis of the discharge nozzle, i.e. the greater the contour deviation in this example, the more likely it is that there will also be reduced stability and/or reduced quality. In such a case, therefore, a monitoring method can serve as a basis for manually, partially automated or fully automated performing of a controlling intervention, for example in the form of a control intervention and/or in the form of a regulating intervention, on the blown film device. In the example described, a controlling intervention can therefore be carried out, for example, by adjusting the production speed, by adjusting cooling air flows in the region of the discharge nozzle or other geometric or production-related method parameters, in order to reduce the contour deviation again the next time a monitoring method according to the invention is carried out.

As can be seen from the example described above, the method can be carried out both qualitatively and quantitatively. Thus, the contour parameters as well as the specific preset values can be set in a purely qualitative reference, so that, for example, a subsequent controlling intervention takes place exclusively when a corresponding maximum or minimum threshold value for the contour deviation is exceeded. However, quantitative monitoring is of course also possible, so that based on the quantitative formation, i.e. the amount of the contour deviation, a corresponding specific controlling intervention can be quantitatively adapted to this amount.

It should also be noted that in a monitoring method according to the invention, the output of the contour deviation as a monitoring result can be designed both for a manual controlling intervention by the operating personnel and for an automated or partially automated controlling intervention by a controlling module of the blown film device. In both cases, the advantages according to the invention are achieved. Due to the fact that now a monitoring of the film shape of the blown film or the film bubble takes place in an automated manner, the advantage of reproducibility can already be ensured in the case of a manual subsequent controlling, since an automated or partially automated detection of the corresponding contour parameter forms the basis for this manual controlling intervention. It is of course preferable if a partially automated or even fully automated regulation or control is carried out as a controlling intervention on the basis of the monitoring result.

It is advantageous if, in a monitoring method according to the invention, the optical detection acquires at least one of the following contour parameters:
  discharge angle from the discharge nozzle
  discharge radius at the discharge nozzle
  transition angle at a transition section
  transition radius at a transition section
  distance between the discharge nozzle and the transition section
  position of at least one partial section of a contour line
  defect and/or perforation in the film bubble
  position and/or course of a frost line of the film bubble.

The above list is not exhaustive. For example, it is conceivable that directly two-dimensionally acquired contour parameters, such as the discharge angle or the transition angle, can be acquired. The discharge angle is the angle that occurs between the outer contour of the film bubble and the central axis of the discharge nozzle in the discharge region directly downstream of the discharge nozzle. As soon as the film bubble is expanded and no further expansion takes place after the frost line, a continuous or, in the side view, parallel shape of the side edges of the film bubble is now given via a transition region. Here, too, a transition angle to this transition section can be determined. Since the film bubble usually runs without kinks here, a corresponding discharge radius and/or a transition radius can also be determined at the two locations of the discharge angle and/or the transition angle. The total distance which is required until the transition section is reached by the film bubble can also provide indications for the method according to the invention. Partial sections or partial positions of the contour line, which can be precisely determined, for example, on the basis of their geometric lateral representation, can also be used as contour parameters. Additionally or alternatively, defects, thin spots or even missing material in the form of perforations in the film bubble can also be detected by a monitoring method according to the invention. The position and/or the course of the frost line, i.e. the location at which the material of the film bubble solidifies, can also be acquired according to the invention. For acquisition in an optical manner, in addition to optical sensors such as camera systems, the acquisition of reflections or similar optical features may also be provided.

It is a further advantage if, in a monitoring method according to the invention, the monitoring result is output as an optical display for an operator of the blown film device. This optical display can be shown both statically in the form of a photo and continuously in the form of a video or in the form of a course of several photos. For example, the blown film device or the film bubble can be shown as a course on the photo or video. Corresponding auxiliary lines can represent the monitoring result in the form of the contour deviation, the contour line or further contour parameters. In this way, an optically improved display can be made available directly to the operator in the form of an augmented reality display (augmented reality), who now receives a hint, so to speak, on the basis of this optical display about the controlling intervention to be carried out by him in a manual manner. The optical display can be part of a corresponding monitoring device. However, at least in part, the monitoring method can also be carried out by the operator on a mobile terminal, for example a tablet or a cell phone, so that by filming the film bubble using the method according to the invention, he now receives the additional information, in particular the display of the monitoring result, as an optical display directly on his mobile terminal in the form of the augmented reality.

It is also advantageous if, in a monitoring method according to the invention, the monitoring result is output to a controlling module, which then carries out at least one controlling intervention on the blown film device based on the monitoring result. In addition to or as an alternative to the manual intervention explained in the preceding paragraph, a partially automated or fully automated feedback with a controlling method of the blown film device can therefore be performed here. This can be a control and/or a regulation. As a controlling intervention, the intervention is specific to the type of contour parameter and/or to the type of contour deviation. The controlling intervention can be both qualitatively specific and quantitatively specific to the contour deviation or the monitoring result.

Further advantages can be gained if, in a monitoring method according to the invention, the monitoring result is compared with a controlling storage, wherein a specific controlling intervention is determined. Such a controlling storage can be designed as a temporary or long-term controlling storage. It also allows the controlling intervention to be indicated as a specific controlling intervention before it is performed. The controlling storage can therefore store a large number of specific controlling interventions in correlation to the respective monitoring result, so that not only linear but also non-linear correlations between monitoring results and specific controlling interventions can be made available. The specific controlling intervention contains both the type and the direction or the quality and/or the quantity of the controlling intervention. Of course, after the controlling intervention, it is possible to write back into the controlling storage which real result factor this controlling intervention had, so that the success or the result of the specific controlling intervention is verifiable and thus the controlling storage is designed to be adaptive and to be improved over time.

There are further advantages if, in a monitoring method according to the invention, the contour deviation and/or the monitoring result is monitored as a function of time. A function of time allows not only snapshots to be taken, but also in particular gradients, i.e. rates of change of the contour parameters under consideration, to be taken into account. Thus, not only a snapshot is possible, but also an oscillation ratio, a wobble ratio or even a regular frequency monitoring of the corresponding contour deviation. For example, film bubbles may tend to pulsate under certain environmental parameters, i.e. expand and contract along a regular frequency. Since this is undesirable for a continuous production result, such frequency-related pulsing as well as trembling or wobbling of the film bubble can be detected here when looking at the contour deviation over time. Also, by detecting the speed of a change, a necessary regulation intervention or controlling intervention can be designed more or less strongly to take account of the actual situation. The information about the function over time can be additionally part of the monitoring result as an additional controlling result and can be output or displayed as such.

It is further advantageous if, in a monitoring method according to the invention, the optical acquisition is symmetrical or essentially partially symmetrical with respect to the film bubble. A symmetrical or essentially symmetrical optical acquisition is based on the fact that a symmetrical or essentially symmetrical design of the film bubble is associated with a high production quality as well as a high production stability. Usually, this is a rotational symmetry or an axial symmetry with regard to the optical coverage. It should also be noted that the symmetry naturally depends on the viewing direction of the optical monitoring device or the optical detection module, so that it can be a rotational symmetry when viewed from above and an axial symmetry when viewed from the side. Of course, different symmetries can also be freely combined with each other in a monitoring method according to the invention.

It is also advantageous if, in a monitoring method according to the invention, before the output of the monitoring result, a detection of people takes place and displayed faces of the people are made unrecognizable. In particular, if the optical detection results are to be stored or if it is necessary to pass on the video or photo sequences, it can be advantageous to make the faces of people unrecognizable. Particularly with regard to data protection aspects, a monitoring method according to the invention can also be used here if persons are or at least partially can be located in the monitored region of the optical detection module.

There are further advantages if, in a monitoring method according to the invention, the position of at least one component of the blown film device and/or an operator is determined in addition to and/or in relation to the at least one contour parameter. This additional relation allows further possibilities to be included in the controlling intervention. For example, manual interventions on a cooling ring of the blown film device can be apparent as position detection with the monitoring method. The corresponding relation of the components and/or the operator are thus considered or even output as part of the monitoring result. In addition to a positioning of a cooling ring, this can also apply to a position detection of a calibration cage, which is arranged above the discharge region in a traversable and movable manner. Thus, the monitoring method can additionally provide collision monitoring, as well as adjustment monitoring of manually adjustable components on the blown film device. Here, too, both qualitative and quantitative and/or absolute dimensions are conceivable in the sense of the present invention.

It is further advantageous if, in a monitoring method according to the invention, the contour deviation and/or the monitoring result is at least partially stored. This can be done, for example, in a controlling storage as already explained. It is thus possible to store monitoring recipes or regulation recipes, which are stored in particular in connection with corresponding contour shapes of the film bubble. Storing associated controlling interventions allows the quality or the probability of success of corresponding controlling interventions to be monitored and improved or adapted controlling interventions to be specifically made available in the future. Individual static images can be stored in whole or in part, as well as video sequences. Of course, to reduce the amount of data to be stored, individual parameters or the course of detected contour parameters can also be stored. As has already been explained, the at least partial storage of the contour deviation, in particular in connection with the controlling interventions, can serve as a basis for a learning system within the blown film device, but also in a superordinate manner for a large number of similar and spaced-apart blown film devices.

Furthermore, it is advantageous if a detection of a sudden change of the contour deviation and/or the monitoring result takes place in a monitoring method according to the invention. As has already been explained several times, in addition to static monitoring of the contour deviation, its course over time can also be detected and form part of the monitoring result. A high gradient in the change can also be referred to as a sudden change, so that such a jump in quality can serve, for example, as a detection of the changing between two film material compositions. The detection of the different material compositions can also be performed with a spectral analysis as part of the optical detection.

Also subject of the present invention is a monitoring device for monitoring a film bubble in a discharge region downstream of a film nozzle of a blown film device. Such a monitoring device comprises an optical detection module for optical detection of at least one contour parameter of a film contour of the film bubble in the discharge region. Further, the monitoring device is equipped with a comparison module for a comparison of the at least one detected contour parameter with a specific preset value. Furthermore, the monitoring device comprises a determination module for determining a contour deviation between the at least one detected contour parameter and the specific preset value. Furthermore, an output module is provided for outputting the contour deviation as a monitoring result. Thus, a monitoring device according to the invention has the same advantages as have been explained in detail with reference to a monitoring method according to the invention. The monitoring device, in particular the detection module, the comparison module, the determination module and/or the output module are thereby preferably designed to carry out a monitoring method according to the invention. It should also be noted that the optical detection module can be arranged essentially anywhere on the blown film device. The optical detection module can thereby comprise a sensor outside the film bubble in the same way as a corresponding optical sensor inside the film bubble. Of course, there can also be two or more individual sensors that form the optical detection module or make them available in the combined view. The alignment can be vertical as well as horizontal and/or angular to the film bubble. As already explained, the optical detection module can also be a combination of two or more identical or different camera systems or other sensors.

Further advantages are gained if, in a monitoring device according to the invention, the detection module comprises at least one of the following devices:

2D camera
3D camera
combination of at least two camera systems
infrared camera
optical sensor.

The above list is not exhaustive. In particular, a small optical photo-chip is used as the optical sensor in order to provide a correspondingly large depth of field. Of course, different camera systems can also be combined. For example, a three-dimensional camera can be provided by two camera sensors that are spaced apart from each other in a defined manner. However, it is also conceivable that a single moving camera can be used to provide three-dimensional image data by changing the angle of view of the film bubble. The combination of static and movable cameras is also conceivable in the sense of the present invention. In principle, depending on the desired contour parameter, the detection module can comprise one or more corresponding sensors in order to allow that their representation in the film bubble can be acquired in digitalized form.

It is also advantageous if, in a monitoring device according to the invention, the detection module comprises a repository device for a movable repository, in particular on the blown film device. Such a movable repository can be designed to be reversibly movable, to be movable once, or to be movable during detection. For example, the movement can be formed in height direction, towards or away from the film bubble in horizontal direction, but also in an angular direction or even in a rotational direction. The movement with this repository can be part of a calibration method, which will be explained later, or it can be part of the detection method itself. Thereby, for example, a setup and/or a variation can take place before the detection, but also during the detection of the orientation or the positioning of the detection module.

It can be a further advantage if, in a monitoring device according to the invention, the optical detection module comprises at least one sub-module for the detection of a specific wavelength or a specific wavelength range. For example, it is conceivable that exclusively an infrared range and/or exclusively an ultraviolet range can be recorded. The combination of specific wavelengths and/or specific wavelength ranges is also conceivable in the sense of the present invention. In particular, for distinguishing non-relevant information on the background or, however, non-relevant information of the film bubble, a significantly facilitated and improved detectability of the at least one contour parameter can be achieved, for example in combination with a corresponding light source emitting this specific wavelength and/or this specific wavelength range.

Further advantages can be gained if, in a monitoring device according to the invention, the optical detection module comprises at least one optical means for optically influencing the optical detection. This may be, for example, a lens, an objective, a filter and/or a mirror or mirror system. The use of optical means allows a freer arrangement as well as the use of cheaper sensor elements for the optical detection module. Also, different optical sensors can be combined within an optical detection module without increasing the complexity of the overall system of the monitoring device.

It is a further advantage if a contrast device is additionally provided in a monitoring device according to the invention, in particular on a side of the film bubble of the blown film device opposite from the position of the detection module. For example, a jacket, a blanket or a contrast screen can be arranged on the rear side of the film bubble to correspondingly create a stronger contrast between the film bubble and the air space next to the film bubble for the detection module. Such an improved contrast allows, on the one hand, to reduce the necessary effort in image processing and, on the other hand, to increase or optimize the detection quality.

Further advantages can be achieved if, in a monitoring device according to the invention, at least one illumination means is additionally provided for illumination of the film bubble in the discharge region. The illumination means can, for example, be adapted to the specific wavelengths and/or specific wavelength ranges already explained or emit light specifically in these ranges. The illumination can be provided from the side, but also from behind, so that both the absorption of the film bubble and the transmission allow a corresponding additional contour detection. Such a defined and specific illumination means can improve the contrast effect and thus further enhance contour detection.

It is a further advantage if, in a monitoring device according to the invention, additionally at least one marking means is provided for a, in particular optical, marking on the film bubble. Such a marking means can, for example, comprise a laser system for arranging optical lines, grids or grid elements on the outside of the film bubble. The corresponding distortion can then be determined and provided to the monitoring method by the optical detection module based on the distorted color markings. Particularly in the case of complex and difficult-to-acquire contour parameters, this can also significantly simplify image evaluation and enable it to be performed more cost-effectively and more quickly.

Further advantages can be gained if, in a monitoring device according to the invention, at least one cleaning means is provided for detecting a need for cleaning of the detection module and/or for carrying out such cleaning. During production with the aid of a blown film device, a large number of different types of contamination, in particular in the form of dust, can take place. Thus, there is a risk that the detection module will become soiled over the period of use and thus the optical detection quality will decrease. The cleaning means is now able to reduce or even completely avoid faulty measurements or the complete failure of the detection module, if a need for cleaning is known and indicated in good time or if the execution of such cleaning can be carried out explicitly and immediately.

It is also advantageous if, in a monitoring device according to the invention, at least one switching means is provided for switching off the optical detection module in the absence of the film bubble and/or in the presence of the operator. Thus, if the film bubble is no longer present because production has stopped, the acquisition can also be switched off with the aid of the detection module, in order to maintain the security and privacy of the operator on the one hand, and at the same time to avoid the recording of data material that is not required.

It is also advantageous if at least one display device for displaying the contour deviation and/or the monitoring result is provided in a monitoring device according to the invention. This display can be designed as an active or passive display, so that in particular in the form of augmented reality the monitored film bubble is displayed together with the additional information of the contour deviation of the monitoring result. This display can also take place, for example, on a separate mobile element, such as a cell phone or a tablet of the operator.

It is also advantageous if, in a monitoring device according to the invention, a storage device is provided for storing the determined contour parameters and/or the outputted monitoring results. This makes feedback possible, and in particular also the storage of a proof of the production stability and the production quality. In addition to the already explained enabling of a learning system for specific controlling interventions, a scale-up can also be made available in this way, so that on the basis of optical data of a pre-series machine, a corresponding implementation and quality and production controlling is possible for a large production machine. Storage can take place, for example, in the region of the monitoring device, but also in a remote diagnostics center, for example in a data cloud.

Further advantages can be gained if, in a monitoring device according to the invention, at least one communication means is provided for transmitting the monitoring results and/or the contour deviations to a remote diagnostic module. This may be in terms of storage in a data cloud as well as in a representation on a more remote display apparatus. For example, the manufacturer of the blown film device can provide a remote diagnostics module with a corresponding remote diagnostics operator, which, without being personally present at the running blown film device, now specifies, releases, triggers or passes on specific controlling interventions to the operator of the blown film device for manual execution.

Another object of the present invention is a calibration method for a calibration of a monitoring device according to the invention, comprising the following steps:
  arranging the optical detection module in a detection position,
  allocating a detection region which at least partially overlaps with a discharge region of the blown film device.

A calibration method according to the invention thus has the same advantages as have been explained in detail with reference to a monitoring device according to the invention and with reference to a monitoring method according to the invention. The detection region is thereby at least partially correlated with the discharge region of the blown film device, so that the calibration method enables the monitoring device to perform the monitoring method according to the invention.

It is advantageous if, in a calibration method according to the invention, the allocation of the detection region is performed by recording the discharge region without film bubble. In this way, a differential image can be provided which, when superimposed on a production image with film bubble, enables an improved and exact representation of the outer contour of the film bubble.

Furthermore, it is possible if at least one step of an alignment of the optical detection module is performed in a calibration method according to the invention. For example, the already described movable repository can be used for this. For example, an alignment with respect to angle, height and/or rotational orientation can be provided. In particular, an adjustment means of such a movable repository can be used.

Figure 2:
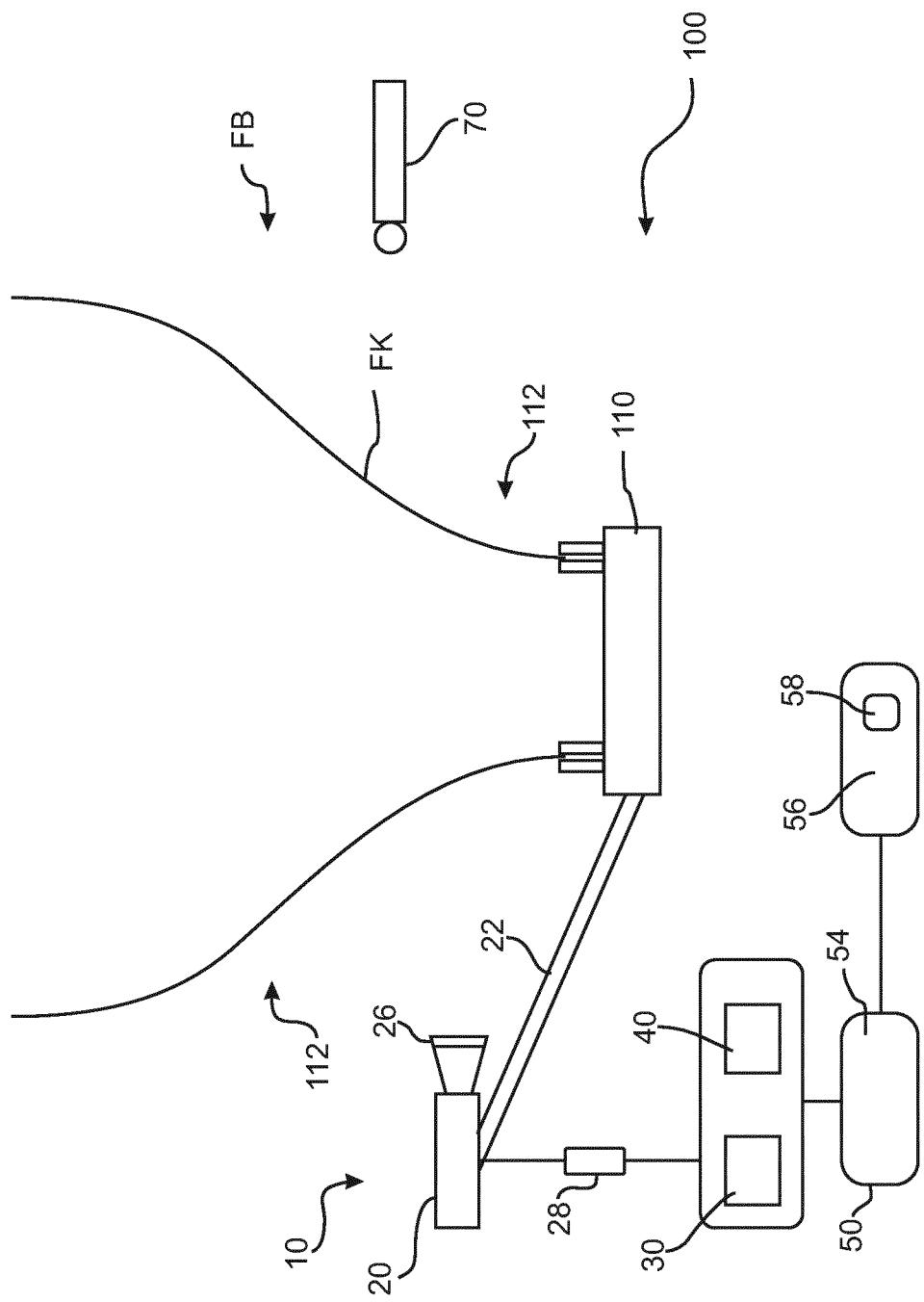
Figure 3:
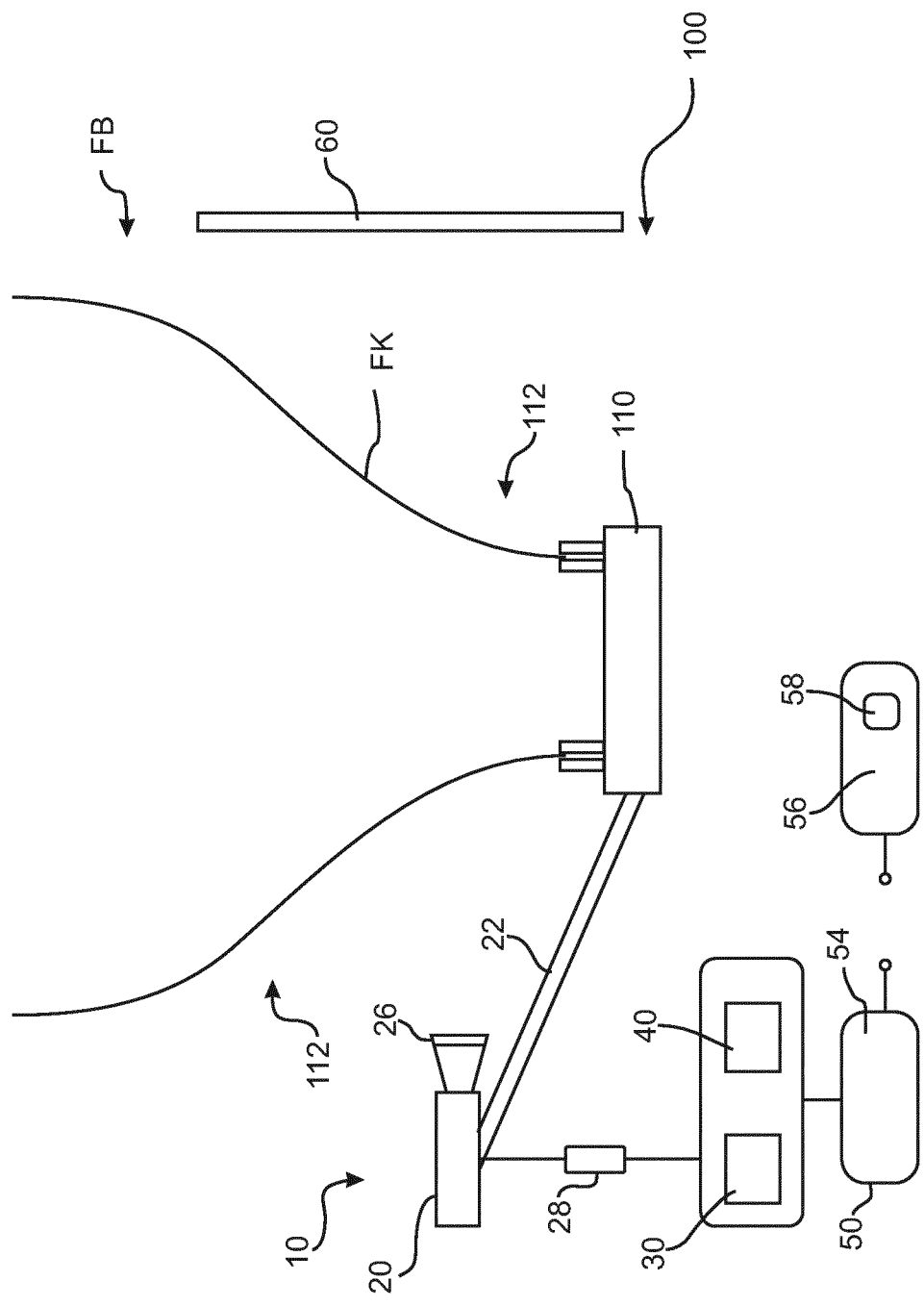
Figure 4:
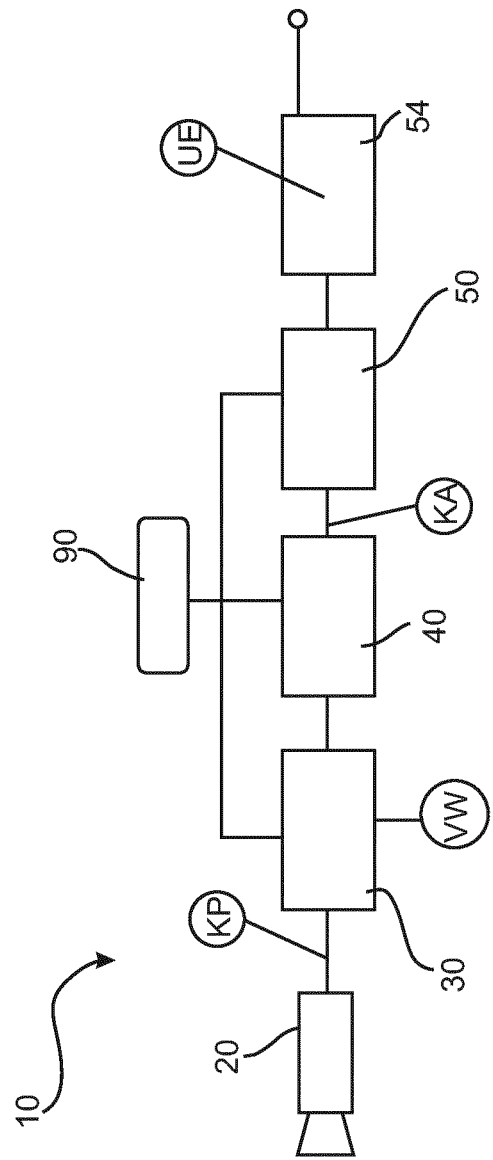
Figure 5:
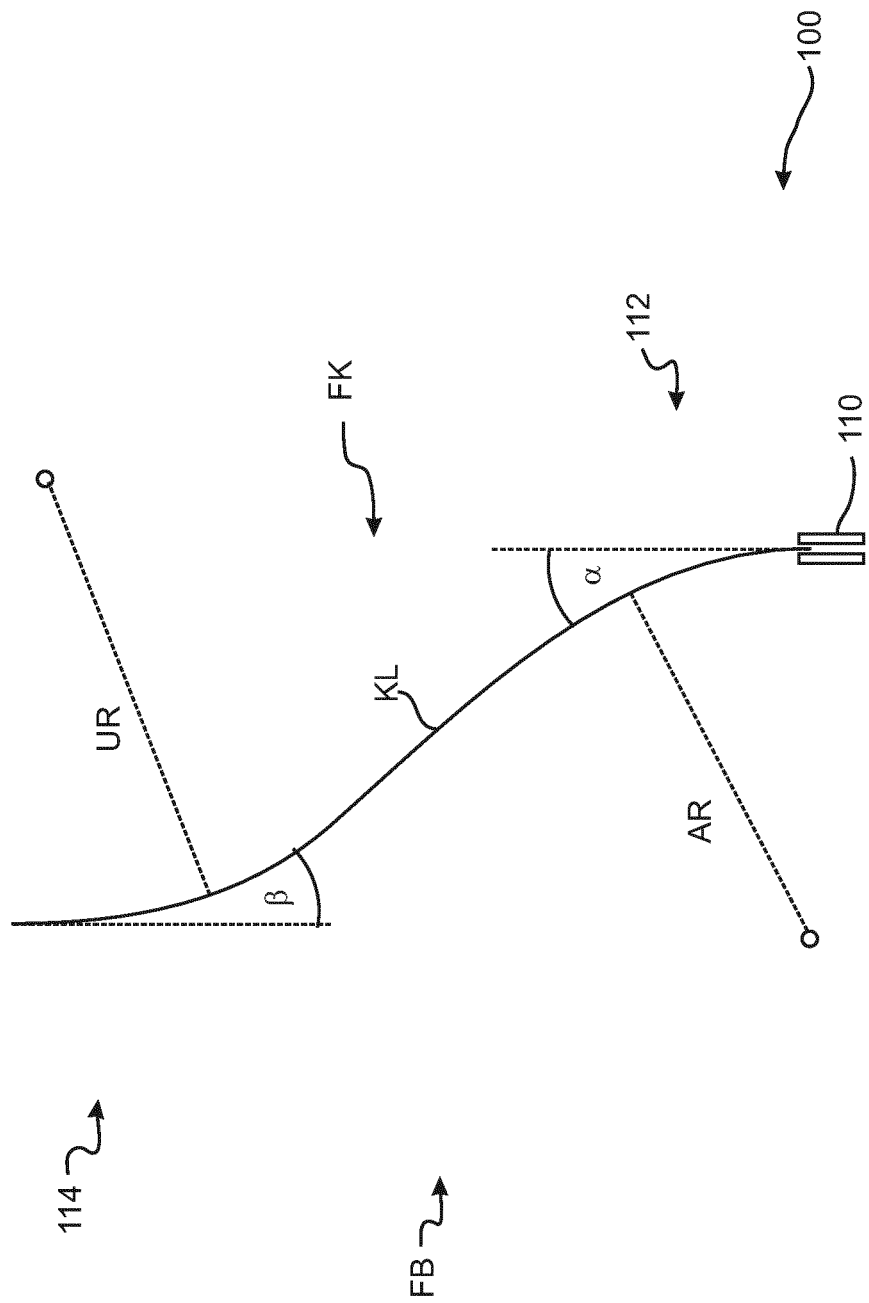

Further advantages, features and details of the invention will be apparent from the following description, in which embodiments of the invention are described in detail with reference to the figures. Thereby, the features mentioned in the claims and in the description may each be essential to the invention individually or in any combination. The figures schematically show:

FIG. 1 an embodiment of a monitoring device according to the invention,

FIG. 2 a further embodiment of a monitoring device according to the invention,

FIG. 3 a further embodiment of a monitoring device according to the invention,

FIG. 4 a further embodiment of a monitoring device according to the invention and FIG. 5 a representation of possible contour parameters.

FIGS. 1 to 4 show different ways of forming a monitoring device 10 according to the invention. FIG. 1 shows schematically how, for example, the monitoring device 10 comprises an optical detection module 20 in the form of a camera device. The optical detection module 20 is equipped on the optical detection side with an optical means 24 in the form of a lens system. In this way, the optical detection module 20 can now detect the film bubble FB shown as a contour in FIG. 1. As a two-dimensional camera device, the optical detection module 20 is capable of detecting the film contour FK and making it available for further processing accordingly. As can also be seen in FIG. 1, the film bubble FB discharges a central discharge nozzle 110 in the blown film device 100. The film bubble FB subsequently expands further within the discharge region 112 and solidifies along a frost line, which is not shown in greater detail, in order to be conveyed further upwards in parallel in this inflated state. The film web produced is then laid flat and wound up so that further processing of the film produced is possible.

The recorded and detected information on the film contour FK can now be further processed in a comparison module 30 and a determination module 40. For example, FIG. 1 shows the solution on a separate display device 52 of the output module 50 to display not only the acquired image of the optical detection module 20, but, not shown in FIG. 1, additional indications of a monitoring result UE. This is, of course, only one way of providing a display and thus a manual controlling intervention possibility.

FIG. 1 also shows a variant in which optical lines are applied to the film bubble FB as an optical grid with the aid of an optical marking means 80. These allow partial regions, in particular partial contours, to be made even easier to compare or determine by the optical detection module 20.

FIG. 2 is basically based on the solution as shown in FIG. 1. Here, the optical detection module 20 comprises a repository device 22 in a movable manner, so that a calibration method or an adjustment of the orientation of the optical detection module 20 is now possible through the connection to the blown film device 100. With the aid of a cleaning means 26, the lens of the optical detection module 20 can be kept free of contamination or even actively cleaned. A switching means 28 can be used to switch off the optical detection module when the blown film device 100 is at a standstill outside of production or when operating personnel is present in the recorded region.

In contrast to the embodiment of FIG. 1, the solution of FIG. 2 shows a communication of the output module 50 via a communication means 54, here cable-connected, with a controlling module 56 and a controlling storage 58 of the blown film device 100. The controlling storage 58 can now provide specific controlling interventions to reduce or eliminate detected contour deviations KA with a specific controlling intervention on the film contour FK. In the embodiment of FIG. 2, furthermore, an illumination means 70 is provided which illuminates at least a part of the film bubble FB with light for improved detection. In particular, this may be defined and specific wavelengths and/or wavelength ranges which correlate with a corresponding detection spectral specificity of the optical detection module 20.

FIG. 3 is also fundamentally based on the solution described in FIGS. 1 and 2. For improved optical detection, however, a contrast device 60 is arranged here as a contrast screen on the right side of the film bubble FB. This allows to facilitate a two-dimensional detection of the optical detection module 20, so that subsequently the evaluation in the monitoring device 10 can be carried out faster and with less computing effort. Also shown here is that by radio transmission from the output module 50, the corresponding transmission of the contour deviation KA and/or the monitoring result UE can be made to a controlling module 56.

FIG. 4 schematically shows the sequence of a method according to the invention in the monitoring device 10. The optical detection module 20 allows the contour parameter KP to be recorded and forwarded. In the comparison module 30, it can be compared with the comparison value VW, so that subsequently the contour deviation KA can be determined by the comparison in the determination module 40. On the basis of the contour deviation KA, the output module 50 can now output the monitoring result UE, in this case via the communication means 54. In this embodiment of FIG. 4, an optional possible storage device 90 is provided, in which contour parameters KP, preset values VW, contour deviations KA and/or monitoring results UE are stored or temporarily stored. This temporal storage can be used for feedback as a learning system, but also for evaluation over time and gradient monitoring.

FIG. 5 schematically shows one side of a film bubble FB of a film contour FK. Individual possibilities of contour parameters KP are shown here by way of example. In the case of the blown film device 100 starting from the discharge nozzle 110 in the region of the discharge region 112, a discharge region with a discharge angle α and a discharge radius AR can be detected. The contour line KL continues into the transition section 114, so that a transition radius UR and a transition angle β can be determined there. The individual contour parameters KP can be used here in combination or individually and also combined with other contour parameters.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS 10 monitoring device
20 optical detection module
22 repository device
24 optical means
26 cleaning means
28 switching means
30 comparison module
40 determination module
50 output module
52 display device
54 communication means
56 controlling module
58 controlling storage
60 contrast device
70 illumination means
80 marking means
90 storage device
100 blown film device
110 discharge nozzle
112 discharge region
114 transition section
α discharge angle
β transition angle
AR discharge radius
UR transition radius
KL contour line
FB film bubble
FK film contour
KP contour parameter
VW preset value
KA contour deviation
UE monitoring result

The invention claimed is:

1. A monitoring method for monitoring a film bubble in a discharge region downstream of a discharge nozzle of a blown film device, comprising the following steps:
   optically detecting at least one contour parameter of a film contour of the film bubble in the discharge region,
   comparing the at least one detected contour parameter with a specific preset value,
   determining a contour deviation between the at least one detected contour parameter and the specific preset value, and
   outputting the contour deviation as a function of time as a monitoring result, wherein gradients of the contour deviation are determined according to the function of time.

2. The monitoring method according to claim 1, wherein the optical detection acquires at least one of the following contour parameters:
   discharge angle from the discharge nozzle,
   discharge radius at the discharge nozzle,
   transition angle at a transition section,
   transition radius at a transition section,
   distance between the discharge nozzle and the transition section,
   position of at least one partial section of a contour line,
   at least a defect or perforation in the film bubble, and
   at least a position or course of a frost line of the film bubble.

3. The monitoring method according to claim 1, wherein at least the monitoring result is output as an optical display for an operator of the blown film device or the monitoring result is output to a controlling module, which then carries out at least one controlling intervention on the blown film device based on the monitoring result.

4. The monitoring method according to claim 1, wherein at least the monitoring result is compared with a controlling storage, wherein a specific controlling intervention is determined or the optical acquisition is symmetrical or essentially partially symmetrical with respect to the film bubble.

5. The monitoring method according to claim 1, wherein, before the output of the monitoring result, a detection of people takes place and displayed faces of the people are made unrecognizable.

6. The monitoring method according to claim 1, wherein at least the position of at least one component of the blown film device or an operator is determined at least in addition to or in relation to the at least one contour parameter.

7. The monitoring method according to claim 1, wherein at least the contour deviation or the monitoring result is at least partially stored.

8. The monitoring method according to claim 1, wherein a detection at least of a sudden change of the contour deviation or of the monitoring result takes place.

9. A monitoring device for monitoring a film bubble in a discharge region downstream of a discharge nozzle of a blown film device, comprising an optical detection module configured to optically detect at least one contour parameter of a film contour of the film bubble in the discharge region, a comparison module configured to compare the at least one detected contour parameter with a specific preset value, a determination module configured to determine a contour deviation between the at least one detected contour parameter and the specific preset value, and an output module configured to output the contour deviation as a function of time as a monitoring result, wherein gradients of the contour deviation are determined according to the function of time.

10. The monitoring device according to claim 9, wherein the detection module comprises at least one of the following devices:
- a 2D camera,
- a 3D camera,
- a combination of at least two cameras,
- an IR camera, and
- an optical sensor.

11. The monitoring device according to claim 9, wherein at least the detection module comprises a repository device for a movable repository or the optical detection module comprises at least one sub-module for the detection of a specific wavelength or a specific wavelength range.

12. The monitoring device according to claim 9, wherein at least the optical detection module comprises at least one optical means for optically influencing the optical detection or a contrast device is additionally provided.

13. The monitoring device according to claim 9, wherein at least one illumination means is additionally provided for illumination of the film bubble in the discharge region.

14. The monitoring device according to claim 9, wherein at least additionally at least one marking means is provided for a marking on the film bubble or at least one cleaning means is provided for at least detecting a need for cleaning of the detection module or carrying out such cleaning.

15. The monitoring device according to claim 9, wherein at least one switching means is provided for switching off the optical detection module at least in the absence of the film bubble or in the presence of an operator.

16. The monitoring device according to claim 9, wherein at least one display device for displaying at least the contour deviation or the monitoring result is provided.

17. The monitoring device according to claim 9, wherein at least a storage device is provided for storing at least the determined contour parameters or the outputted monitoring results or at least one communication means is provided for transmitting at least the monitoring results or the contour deviations to a remote diagnostic module.

18. A calibration method for a calibration of a monitoring device for monitoring a film bubble in a discharge region downstream of a discharge nozzle of a blown film device, comprising an optical detection module for optical detection of at least one contour parameter of a film contour of the film bubble in the discharge region, a comparison module for a comparison of the at least one detected contour parameter with a specific preset value, a determination module for determining a contour deviation between the at least one detected contour parameter and the specific preset value, and an output module for outputting the contour deviation as a function of time as a monitoring result, wherein gradients of the contour deviation are determined according to the function of time, comprising the following steps:
- arranging the optical detection module in a detection position, and
- allocating a detection region which at least partially overlaps with a discharge region of the blown film device.

19. The calibration method according to claim 18, wherein at least the allocation of the detection region is performed by recording the discharge region without film bubble or at least one step of an alignment of the optical detection module is performed.

\* \* \* \* \*